July 24, 1928.
T. REPAY
1,678,166
SEPARABLE FASTENER
Filed Nov. 22, 1926
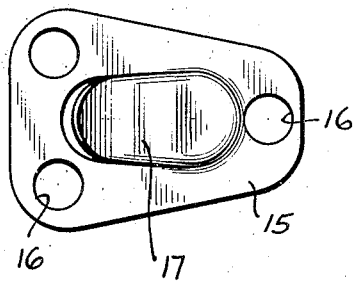
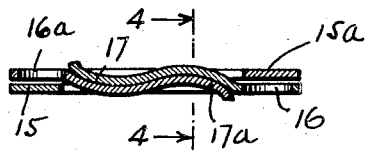
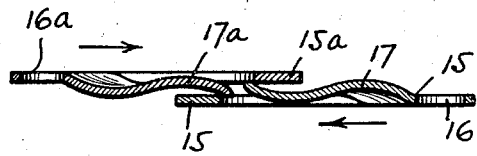
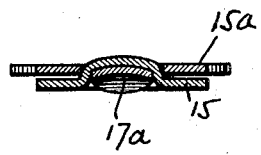
INVENTOR
THEODORE REPAY
BY
ATTORNEY Patented July 24, 1928.

1,678,166

UNITED STATES PATENT OFFICE.

THEODORE REPAY, OF LOS ANGELES, CALIFORNIA, ASSIGNOR TO FERNANDO SPANGENBERG, OF LOS ANGELES, CALIFORNIA.

SEPARABLE FASTENER.

Application filed November 22, 1926. Serial No. 150,105.

My invention relates to and has for its purpose the provision of a separable fastener by which any two elements can be connected with facility and dispatch and in such manner that for all purposes for which it is designed it will function to lock the elements against accidental disconnection, yet permitting the ready disconnection of the elements when desired. My invention is capable of being manufactured at a relatively low cost, yet is durable and efficient for the many uses to which it may be put, as it is susceptible to many adaptations such as fasteners for curtain brackets, garments and motor vehicle curtains.

I will describe only one form of separable fastener embodying my invention, and will then point out the novel features thereof in claim.

In the drawings

Figure 1 is a view showing in top plan one part of one form of separable fastener embodying my invention;

Figure 2 is a central longitudinal sectional view of the complete separable fastener, with the two parts thereof in locked position;

Figure 3 is a view similar to Figure 2, showing the parts of the fastener in released position;

Figure 4 is a vertical sectional view taken on the line 4—4 of Figure 2.

In the present embodiment of the invention, the separable fastener is made up of two parts, and as such parts are identical in construction a description of one will suffice for both, although to distinguish the elements of the two parts from each other the reference characters for the elements of one part bear exponents.

Each part comprises a plate 15 of suitable metal and in the present instance of substantially triangular outline, with three openings 16 therein through which threads of any suitable fastening means may extend for securing the part as a unit to an element to be secured to another element carrying the other part of the fastener. The central longitudinal portion of this plate is outstruck to form a tongue 17 which is connected to the plate at one end but which is disconnected from the plate at the other end as well as along the side edges of the tongue for a distance sufficient to permit the insertion and proper engagement of the tongue of the other part of the fastener.

In forming the tongue 17 it is curved longitudinally, and in the present instance it is constructed to describe an ogee curve, although it is to be understood that it may be constructed with other curvatures so long as the proper interlocking effect is produced when associated with the tongue of the component part.

In associating the two parts of the fastener with each other when desiring to detachably connect the elements carried by the parts to each other, the parts are reversely disposed as illustrated in Figure 3, so that the leading or free ends of the tongues are disposed between each other and the plates or the openings in the plates at the free ends of the tongues. By now moving the plates 15 and 15$^a$ toward each other as illustrated by the arrows in Figure 3, the tongues 17 and 17$^a$ can be moved to the locked position shown in Figure 2, in which the tongue 17 is disposed beneath the tongue 17$^a$. During the movement of the tongues to this locked position a lateral flexing of the tongues is effected because of the force necessary to pass the curved end of one tongue beyond the curved end of the other and to the final position illustrated in Figure 2. As the tongue moves into its final position it returns to its normal form, thus effecting interlocking engagement with the other tongue to prevent the accidental disengagement thereof so that the plates are locked together on the elements carried thereby. It will of course be understood that the parts of the fastener are capable of being released or separated by exerting sufficient outward pull upon the tongues to cause their curved free ends to pass beyond each other, the tongues in their final released position assuming the normal form so as to be positioned for reinterlocking when desired.

Although I have herein shown and described only one form of separable fastener embodying my invention, it is to be understood that various changes and modifications may be made without departing from the spirit of the invention, and the spirit and scope of the appended claim.

I claim:

In a two part separable fastener, a fastener comprising a flat body having an elongated tongue outstruck from one side of the body and only free of the body at one end and along a portion of the sides of the tongue, the tongue being of ogee form in longitudinal section with its free end flared outwardly from the body to permit the insertion of an identical tongue on the flat body of a second fastener, the attached portion of the tongue extending partially along the sides of the tongue and forming a dished pocket to receive the free end of the tongue of the second fastener and cooperating with the ogee form of the tongue to prevent rotational movement between the two fasteners.

THEODORE REPAY.